United States Patent [19]

Anderson

[11] 4,313,111
[45] Jan. 26, 1982

[54] NOZZLE CONDITION MONITOR

[76] Inventor: Jack W. Anderson, Rte. #1, East Berlin, Pa. 17316

[21] Appl. No.: 148,599

[22] Filed: May 12, 1980

[51] Int. Cl.³ .............................................. G08B 21/00
[52] U.S. Cl. ..................................... 340/606; 340/608; 340/611; 200/81.9 M
[58] Field of Search .............. 340/606, 607, 608, 611, 340/623, 624, 684, 626; 73/523, 713, 744, 516 R; 200/81.9 M; 137/557

[56] References Cited

U.S. PATENT DOCUMENTS

| | | | |
|---|---|---|---|
| 2,963,563 | 12/1960 | Patterson | 340/606 |
| 3,224,270 | 12/1965 | Karol et al. | 200/81.9 M |
| 3,392,580 | 7/1968 | Bain et al. | 340/606 |
| 3,446,986 | 5/1969 | Cox | 340/606 |
| 3,538,274 | 11/1970 | Gfeller | 200/81.9 M |
| 3,632,923 | 1/1972 | Paine | 200/81.9 M |
| 3,782,501 | 1/1974 | Pagella | 340/606 |
| 4,081,635 | 3/1978 | Moore | 200/81.9 M |
| 4,166,936 | 9/1979 | Tice | 340/611 |
| 4,181,835 | 1/1980 | Stadler et al. | 340/611 |
| 4,193,356 | 3/1980 | Veal et al. | 340/608 |

Primary Examiner—Gerald L. Brigance
Attorney, Agent, or Firm—Webb, Burden, Robinson & Webb

[57] ABSTRACT

A nozzle condition monitor for detecting the adequacy of the flow through a fertilizer application nozzle. The monitor comprises a nonmagnetic housing having an up-right passage. Within the passage, a magnetic piston is arranged as the flow may take place along the sides of the piston. Stoppers are arranged to restrict travel of the piston. A magnetic switch is arranged near one end of the up-right passage to be closed when the piston is moved against the stop at that end. Means for detecting the condition of the magnetic switch generate a signal indicative of the adequacy of the flow through the nozzle and therefore the condition of the nozzle.

4 Claims, 2 Drawing Figures

NOZZLE CONDITION MONITOR

BACKGROUND

A persistent problem to the operator of a tractor or other vehicle spreading liquid chemical fertilizer over a planted field is that he cannot simultaneously observe the pathway through the planted crop rows and also observe the spray issuing from each nozzle. The operator simply does not have eyes in the back of his head. It is not an uncommon problem for nozzles to clog and for nozzles to cease to spray fertilizer as desired. Since uniform distribution of fertilizer is a key to a profitable harvest, the operator must either move very slowly through the field so as to observe both the pathway through the crop rows and the spray from the nozzle or a second operator must be hired to simply observe nozzle operation. Even this will not necessarily avoid uneven distribution (with the attendant streaking). It is not really possible, in many cases, to observe when a nozzle has slowed the delivery of liquid fertilizer but has not altogether stopped spraying.

The prior art has contemplated apparatus for detecting the clogging of orifices used for spreading particulate (powdered) fertilizers. See for example U.S. Pat. No. 3,443,724. One drawback of this device is that only after the orifice has been clogged for sometime is it possible to detect that the orifice has been clogged. If all of the orifices slowly constrict, there will be no indication of clogging as there will be no relative change in the condition of the sensing devices. Relative downward movement of the rods will not take place. Apparatus for measuring liquid flow or liquid level not related to monitoring of spraying of liquid fertilizer is known. See, for example, U.S. Pat. Nos. 2,523,666; 3,389,603; and 3,446,986.

It is an advantage according to this invention to provide a system for detecting the clogging of the nozzles on a fertilizer spraying boom that requires almost no additional fasteners or brackets or plumbing associated with the boom. If the nozzles normally turn into threaded sockets in the boom, the nozzles are removed and replaced by a short pipe threaded at each end. The internally threaded inlet port of the sensing module according to this invention is then turned on to the exposed end of the short pipe and the nozzle is turned directly into the internally threaded outlet port of the sensing nozzle. No additional fasteners or brackets are required.

The flow sensing module according to this invention is easily disassembled for cleaning and for removal or replacement of sizing sleeves which make the sensing module adaptable for monitoring a wide number of spraying rates. In other words, by simple and easy replacement of sleeves in the sensing module the threshold flow below which a warning is effected may be adjusted.

While the flow sensing module according to this invention is easily cleaned, it is also designed so that no pockets of still or very slow moving fertilizer liquid are present to accumulate whatever might settle out of the fertilizer liquid thereby fouling the piston in the sensing unit.

SUMMARY OF THE INVENTION

Briefly according to this invention, there is provided an apparatus for monitoring liquid flow through a conduit leading to a nozzle. A nonmagnetic housing comprises an up-right passage having upper and lower ports opening into each end of the passage. A magnetic piston is arranged within the passage such that flow may take place along the sides of the piston from the lower port to the upper port. When the flow is sufficient, the piston is carried upward within the passage. Stoppers are arranged to restrict the travel of the piston to prevent it from moving into a position adjacent either the inlet or outlet port. A reed switch is arranged near the up-right passage near one of the extremes of the travel of the magnetic piston such that when the piston is at one of its extreme positions, it will close the reed switch. As used herein, the term "magnetic piston" means, for example, a magnetized metal cylinder or a molded plastic piston having at least an embedded magnet appropriately arranged to cause the reed switch to close when the piston is moved against one of the stops. The magnet is arranged such that the gaps between the reeds forms a portion of the external magnetic circuit of the magnet. Preferably the magnet is circularly magnetized so that no orientation as by rotation of the magnetic piston is required. Apparatus is provided, for example a suitable electric circuit, for detecting the condition of the reed switch to produce an electrical signal indicative of whether or not flow through the up-right passage is taking place.

THE DRAWINGS

Further features and other objects and advantages of this invention will become clear from the detailed description made with reference to the drawings in which FIG. 1 illustrates the general arrangement of a monitoring system for a plurality of spray nozzles, and FIG. 2 is a section through a flow sensing module according to this invention.

DESCRIPTION OF THE PREFERRED EMBODIMENTS

Figure 1:
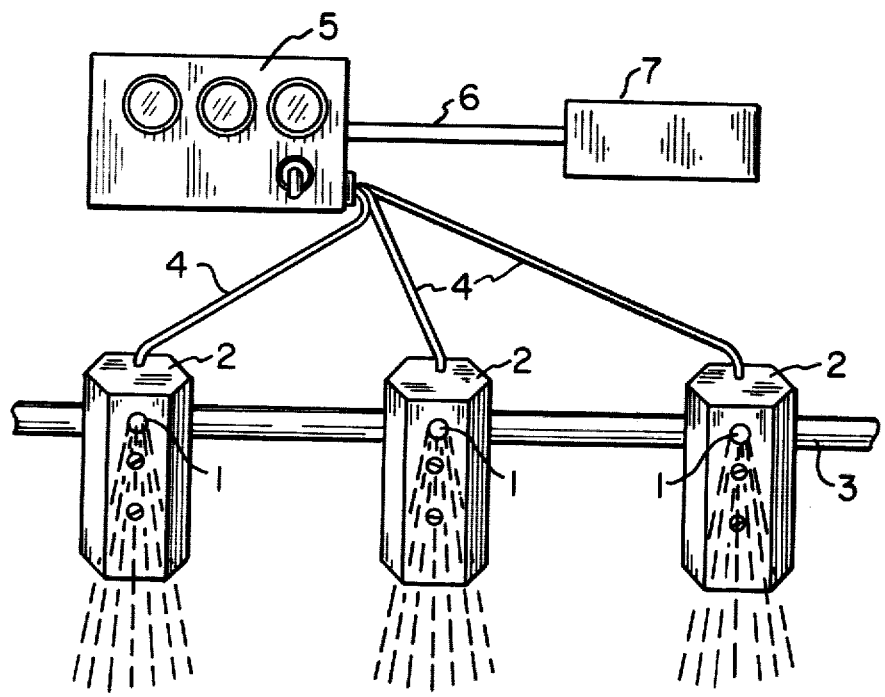

Referring now to FIG. 1, there is illustrated a plurality of spray nozzles 1 secured to a plurality of flow sensing modules 2 according to this invention. The modules 2 are all secured to a boom 3 which carries the main distribution pipe of the liquid fertilizer distribution system. Each module is in communication with inlet ports of one nozzle. Leading away from each module 2 are pairs of wires 4 which connect a reed switch in each module to an annunciator console 5. The annunciator console is provided with electrical power by connections 6 with a battery 7.

Figure 2:
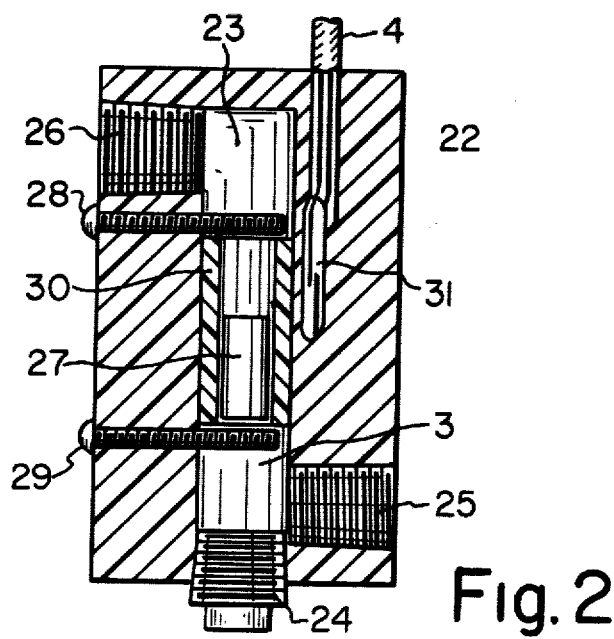

Referring now to FIG. 2, the sensing module comprises a body 22 made of PVC plastic or similar nonmagnetic material. The body has an elongate up-right or vertical flow passage 23 extending into the body from the top or bottom of the body (as shown extending from the bottom in FIG. 2). The passage is threaded near where it opens out of the body to thereby receive a threaded plug 24. An inlet bore 25 transverse to the up-right passage 23 is in communication with the lower end of the up-right passage. The inlet bore 25 is provided with internal threads enabling it to be connected to an externally threaded conduit extending out from a generally horizontal sprayer boom. An outlet bore 26 transverse to the up-right passage 23 is in communication with the upper end of the up-right passage 23. The outlet bore 26 has internal threads that enable the nozzle to be turned directly into the body 22. In a preferred embodiment, the inlet and outlet bores have three-quarter inch pipe threads making the module suitable for use with most typical spraying equipment.

A magnetic piston 27 is arranged in the up-right passage. It is held in the central portion of the passage by two threaded stops 28 and 29. According to a preferred embodiment, the stops comprise aluminum or some other suitably corrosion resistent metal.

According to a preferred embodiment, the up-right passage has a nonmagnetic tubular sleeve or liner 30 which is held in axial position by the threaded stops 28 and 29. The liner 30 has an outer diameter just less than the inner diameter of the up-right passage. The liner 30 is designed for easy removal and/or replacement by another tubular liner having a different internal diameter. Thus the clearance between the internal diameter of the liner (or the up-right passage, as the case may be) and the outer diameter of the magnetic piston may be varied. This enables the nozzle monitor to be used with a wide variety of flow rates. For the higher flow rates, larger inner diameter tubular liners (or no liner at all) are used. If the space between the piston and inner diameter of the liner (or up-right passage where no liner is in place) is too small, the desired flow rates will not be achieved. If the space is too big, the desired flow rates will not carry the piston to the upper stop in the up-right passage.

A reed switch 31 is embedded in the body 22 adjacent one end of the up-right passage. A basic magnetic reed switch consists of two flat overlapping low reluctance metal reeds separated by a small air gap and sealed in a glass envelope. Used with suitable circuitry, the reeds will make, break or transfer an electrical circuit under the influence of a magnetic field. A magnetic field causes the reeds to move together by magnetic induction when the flux density in air gap between the reeds overcomes the spring separation resistance of the reed. Reed relays may be actuated through several combinations of magnetic and reed positions. Alternatively, the reed switch could be embedded near the lower end of the up-right passage. Lead wires 4 are attached to each leaf of the reed switch which emerges from the body 22. The lead wires are sufficiently long to extend to the console 5 mounted in the cab of the tractor or vehicle carrying the spray boom 3.

It should be understood that switches which are activated by a magnetic field may be equivalent to a reed switch in the invention disclosed herein. Therefore, it is possible that the nozzle monitor may, in place of the reed switches, use magnetic trigger cells (i.e, magnetically actuated mercury switches) or solid state Hall effect switches. Magnetic trigger cells form a contact by merging of two mercury films into a continuous conducting path. Surface tension and magnetic forces control the mercury films making the trigger cells reliable in operation in any position. Sealed in a metal capsule, the magnetic trigger cells are virtually immune from damage from heat, vibration or physical abuse. In the case of a Hall effect magnetically operated solid-state switch, the switching element is a Hall sensor with a trigger and amplifier integrated in a silicon chip. The presence of a magnetic field creates a small voltage across the Hall element conductor. The signal is then amplified to trigger on a power SCR.

The console can be of a number of different designs which detect either open or closed condition of the reed switch. If the reed switch is placed near the upper end of the up-right passage, the open condition of the switch is the alert condition. Consider that when a nozzle is unblocked and liquid fertilizer is flowing up through the up-right passage, the magnetic piston is carried to the upper stop. In this position, the reed switch will close. The closed position will then indicate all is well. On the other hand, if the reed switch is placed near the bottom of the up-right passage, then the open condition of the switch will indicate that all is well.

The construction of the magnetic piston is simple. It may, for example, be three-eighths inch round stock magnetized with poles at each end. The orientation of the magnet will not matter. Also, the magnetic piston may be a cast block of nonmagnetic material with an embedded magnet. Various arrangements and placements of magnets are possible to cause the reed switch to close when the piston is forced to the upper stop position (assuming the reed switch is adjacent the upper stop position). Closure of the switch is not necessarily caused by direct alignment of a magnetic pole with the gap of the reed switch depending upon the particular arrangement of the other pole. A magnet perpendicular to the axis of the reed switch envelope and directly aligned will not hold the switch closed. This is because the reeds lie perpendicular to the field and the air gap is not needed for completion of the external magnetic circuit. Further, since it is undesirable to key the piston to avoid rotation thereof the piston should have a magnet embedded therein which has circular symmetry. Hence, it is suitable according to this invention to embed an axially magnetized rare earth cobalt magnet in the piston near one end. A suitable magnet may have a donut shape with one axial shape polarized north and the other axial face polarized south. The magnet is oriented relative to the piston such that the cylindrical axes of each are parallel. As the magnet moves towards alignment with the reed switch, the air gap between the reeds becomes part of the external magnetic circuit of the magnet and the magnetic field forces the reeds to move together.

As used herein, the term "magnetic piston" means a piston comprising a magnet itself or having an embedded magnet appropriately arranged to cause the reed switch to close when the piston is moved against one of the stops.

The annunciator circuit may simply comprise a series circuit including the electrical power supply, a warning light and/or alarm buzzer, and the reed switch. When the switch closes, the light will go "on" and the buzzer will sound.

As described herein, the fertilizer liquid enters a lower inlet bore, flows upwardly through the up-right passage and exits through an upper outlet bore. In this way, gravity pulls the piston down to the lower stop whenever flow ceases. For proper operation, the up-right passage of the monitor must not be too far from the vertical. By placing a spring in the piston passage that biases the piston toward the inlet end, the monitor is less dependent upon gravity for operation and the passage may vary from the vertical.

Having thus defined my invention with the detail and particularity required by the Patent Laws, what is desired protected by Letters Patent is set forth in the following claims.

I claim:

1. Apparatus for monitoring liquid flow through a conduit leading to a nozzle comprising:
    (a) a nonmagnetic housing having an up-right passage therein having upper and lower ports opening into each end of the passage, (b) a removable hollow nonmagnetic sleeve disposed within the up-right passage, (c) a magnetic piston arranged within the sleeve such that flow may take place along the sides of the piston from the lower port to the upper port and such that when the flow is sufficient, the piston is carried upward within the sleeve, (d) stoppers arranged to hold the sleeve within the up-right passage and to restrict the travel of the piston to prevent the piston from moving into a position adjacent to either port, (e) a magnetic switch arranged near the up-right passage near one of the extremes of travel of the magnetic piston such that when the piston is at one of its extreme positions it will close the magnetic switch, and (f) means for detecting the condition of closure of the magnetic switch to produce an electrical signal indicative of whether or not flow through the passage is taking place.

2. Apparatus according to claim 1 wherein the up-right passage is cylindrical and the piston and sleeve are both cylindrical having generally vertical, cylindrical axes.

3. Apparatus according to claims 1 or 2 wherein the stoppers comprise nonmagnetic elongate threaded elements that are turned into the housing and at least partially enter the up-right passage.

4. Apparatus according to claim 1 wherein the up-right passage has a plug aligned with one end thereof which may be removed to provide access to the passage for insertion or removal of the sleeve and piston or for cleaning.

* * * * *